United States Patent
Yerazunis et al.

(10) Patent No.: US 6,477,588 B1
(45) Date of Patent: Nov. 5, 2002

(54) DIGITAL PERSONAL ASSISTANT DOCKING STATION CAMERA

(75) Inventors: William S. Yerazunis, Acton; Darren L. Leigh, Belmont, both of MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 0 days.

(21) Appl. No.: 09/447,017

(22) Filed: Nov. 22, 1999

Related U.S. Application Data

(63) Continuation-in-part of application No. 09/415,635, filed on Oct. 12, 1999.

(51) Int. Cl.⁷ .............................. G06F 13/00; G06F 1/16
(52) U.S. Cl. ...................... 710/13; 710/104; 710/303; 713/310; 455/466; 361/686
(58) Field of Search .................... 710/13, 104, 303; 713/310; 455/466; 361/686

(56) References Cited

U.S. PATENT DOCUMENTS

| | | | |
|---|---|---|---|
| 5,940,767 A | * | 8/1999 | Bourgeois et al. ......... 455/349 |
| 6,021,187 A | * | 2/2000 | Tombetti ............... 379/110.01 |
| 6,029,215 A | * | 2/2000 | Watts et al. ................ 361/683 |
| 6,072,695 A | * | 6/2000 | Steiger et al. ............. 361/686 |
| 6,320,593 B1 | * | 11/2001 | Sobel et al. ................ 345/600 |

* cited by examiner

*Primary Examiner*—Jeffrey Gaffin
*Assistant Examiner*—Rehana Perveen
(74) *Attorney, Agent, or Firm*—Dirk Brinkman

(57) ABSTRACT

A docking station is adapted to operate with a personal digital assistant. The docking station includes an image sensor configured to acquire images, a sensor microprocessor coupled to the sensor, a vision microprocessor coupled to the sensor microprocessor and an instruction memory and a data memory, a communication interface coupled to the vision microprocessor, and configured to interface with a digital personal assistant and a computer system interface and a power supply. A housing of the docking station encloses the image sensor, the sensor microprocessor, the vision microprocessor and memories, the communications interface, and a power supply. During operation, a personal digital assistant is physically and electronically coupling to a top oblique surface of the housing.

4 Claims, 6 Drawing Sheets

DIGITAL PERSONAL ASSISTANT DOCKING STATION CAMERA

CROSS-REFERENCE TO RELATED APPLICATION

This is a continuation-in-part of U.S. patent application Ser. No. 09/415,635 filed on Oct. 12, 1999 filed by Yerazunis et al. incorporated herein by reference.

FIELD OF THE INVENTION

This invention relates generally to computer accessories, and more particularly to accessories adapted for use with digital personal assistant docking station devices.

BACKGROUND OF THE INVENTION

In the prior art, digital still cameras have been adapted to work with workstations, personal computers, and even laptop devices.

In U.S. Pat. No. 5,708,853, Sanemitsu describes a Personal Computer Memory Card International Association (PCMCIA) card that includes an image input device. The card can be inserted into an PCMCIA slot of a lap-top computer. In one configuration, holes are formed in the casing of the lap-top so that an image input device can acquire a picture. The card requires that the computer device is equipped with PCMCIA "slot" and mounting frame.

There are a number of problems with this configuration. First, the PCMCIA standard requires that the dimensions of the slot be about 9×6×1.5 cm. For many modern PDA's, such as a PalmPilot (12×8×1.5), the slot and frame would consume nearly the entire interior of the PDA. In such applications, the card according to Sanemitsu would be totally unworkable. More recent PDA are even smaller than the PCMCIA card.

Second, the PCMCIA card has two connectors, front and back. The back 64 pins interface to the computer, and the front pins, which vary depending on the communications interface, need to be connected to some type of transmission controller connected to a communications line. Sanemitsu suggests an ISDN telephone line. This is a severe limitation making the device totally useless in most PDA type of environments where a communications line is not always available. In combination, the size of the PCMCIA card and the requirement for connection to a communication line make this solution completely impractical for modern mobile personal digital assistants.

In U.S. Pat. No. 5,948,086 Lin describes an electronic still camera that is adapted for use with a portable computer that is equipped with a housing for receiving a removable and rechargeable battery pack. This arrangement also has a number of problems similar to Sanemitsu's camera. First, the size of a rechargeable battery pack overwhelms any modern PDA. Second, this camera presumes that the device is equipped with a removable battery. This is not the case with most PDAs, which are powered by disposable batteries.

In other configurations, the camera is loosely tethered to the PDA. This presents an ergonomic problem since it is awkward to handle both the PDA and camera at the same time.

Therefore, it is desired to provide a camera system that can be used with a PDA in a rigid and ergonomic manner.

As a second characteristic, prior art cameras only acquire still or moving images. Other than controlling exposure, there is very little control of how the images are acquired. Therefore, there is a need for a camera that can be used with a PDA so that the PDA can control higher level camera functions, such as image enhancement, x-y projections, resolution, and the like.

SUMMARY OF THE INVENTION

The invention provides a docking station that is adapted to operate with a personal digital assistant. The docking station includes an image sensor configured to acquire images, a sensor microprocessor coupled to the sensor, a vision microprocessor coupled to the sensor microprocessor and an instruction memory and a data memory, a communication interface coupled to the vision microprocessor, and configured to interface with a digital personal assistant and a computer system interface and a power supply.

A housing of the docking station encloses the image sensor, the sensor microprocessor, the vision microprocessor and memories, the communications interface, and a power supply. During operation, a personal digital assistant is physically and electronically coupling to a top oblique surface of the housing.

DETAILED DESCRIPTION OF THE PREFERRED EMBODIMENT

Figure 1:
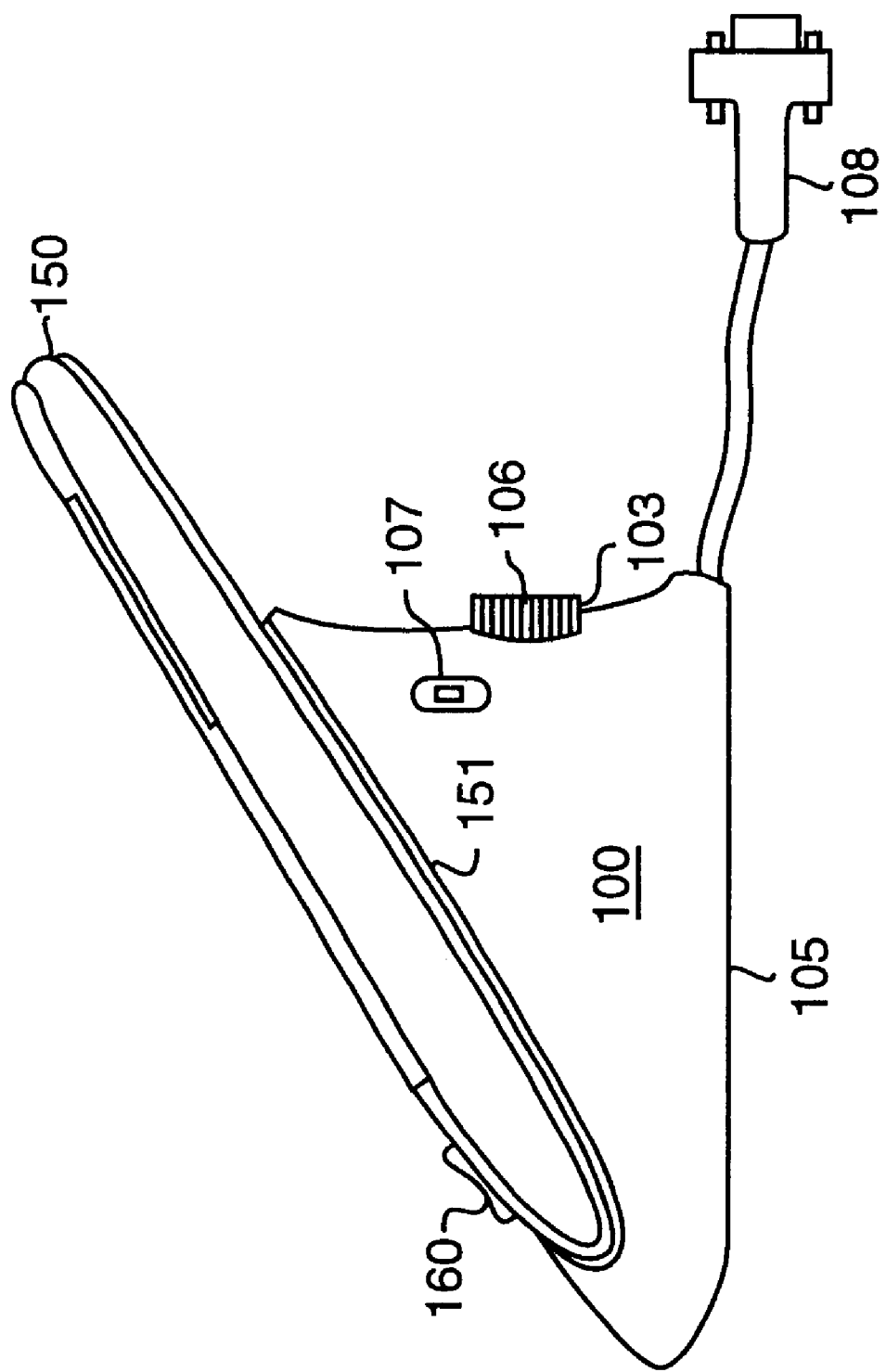
FIG. 1 is a side view of a computer vision system adapted for use with a docking station of a personal digital assistant.
Figure 2:
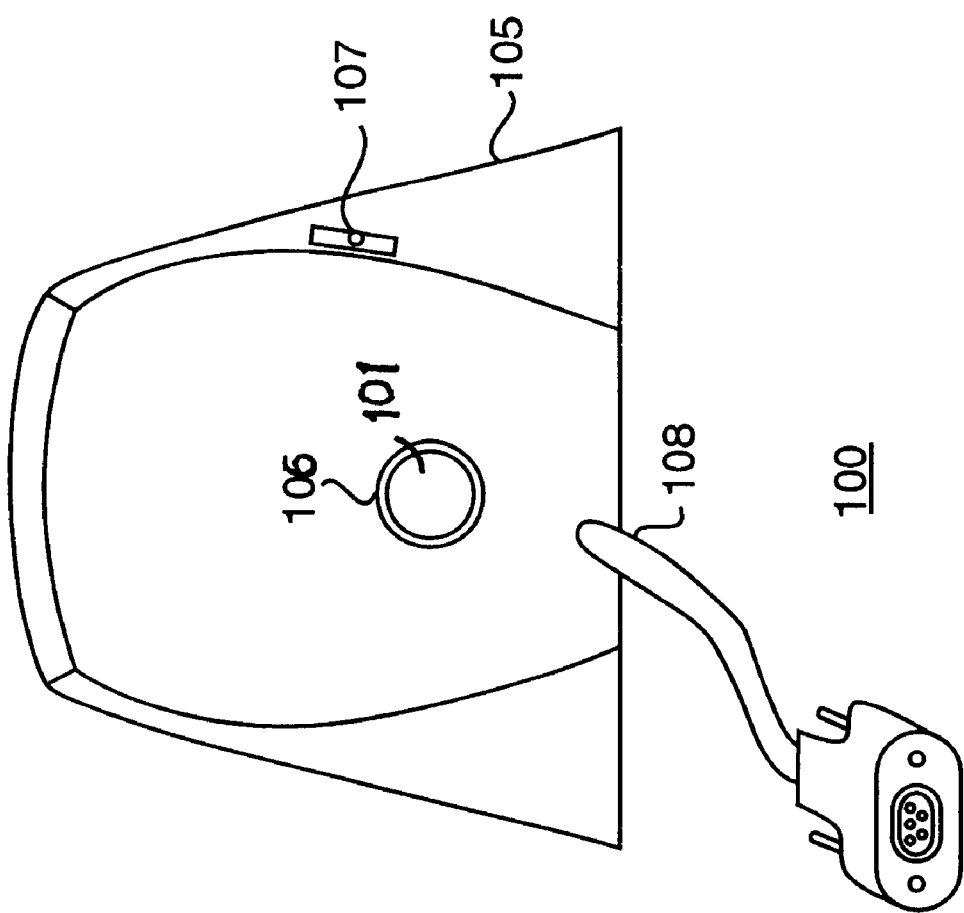
FIG. 2 is a back view of the computer vision system adapted for use with the docking station.
Figure 3:
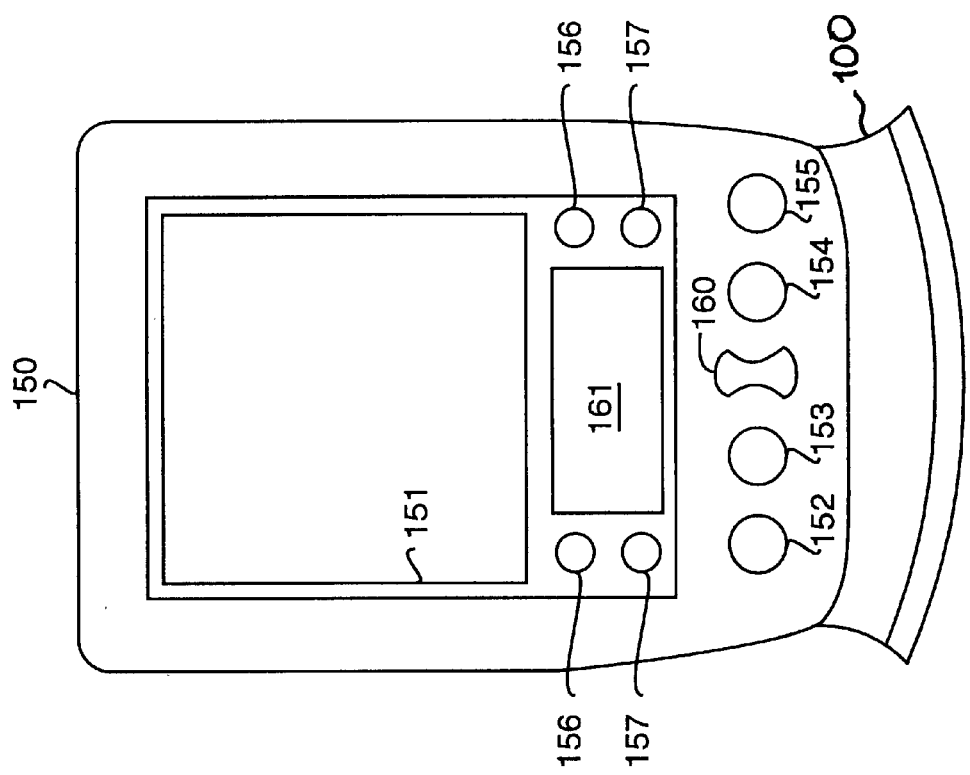
FIG. 3 is an front view of the computer vision system docking station and the personal digital assistant.

FIGS. 1–3 respectively show side, back, and front views of a preferred embodiment for a computer vision system docking station ("cradle") 100 adapted for use with a normally handheld personal digital assistant (PDA) 150. The docking station includes a housing 105 a camera 106, an on-off switch 107, and a (serial RS232) connector 108.

During operation, the PDA 150 is disposed on an upper surface 151 of the housing 105. The vision system is housed entirely outside the PDA to retain the ergonomic operability of the PDA. During operation, the PDA 150 can be used to operate the computer vision system inside the housing 105. Alternatively, the docking station vision system and PDA can be operated synchronously with a personal computer or workstation (not shown) connected to the docking station 100 via the connector 108.

As shown in FIGS. 1 and 2, the PDA 150 to which the present computer vision system is adapted includes a display screen 151, hardware buttons 152–155, silk-screened buttons 156–159, a scroll button 160, and a writing surface 161. The PDA shown is a PalmIII PalmPilot™ handheld computing device. It should be understood that the vision system can be adapted for use with other docking stations of similar handheld PDA devices.

Figure 4:
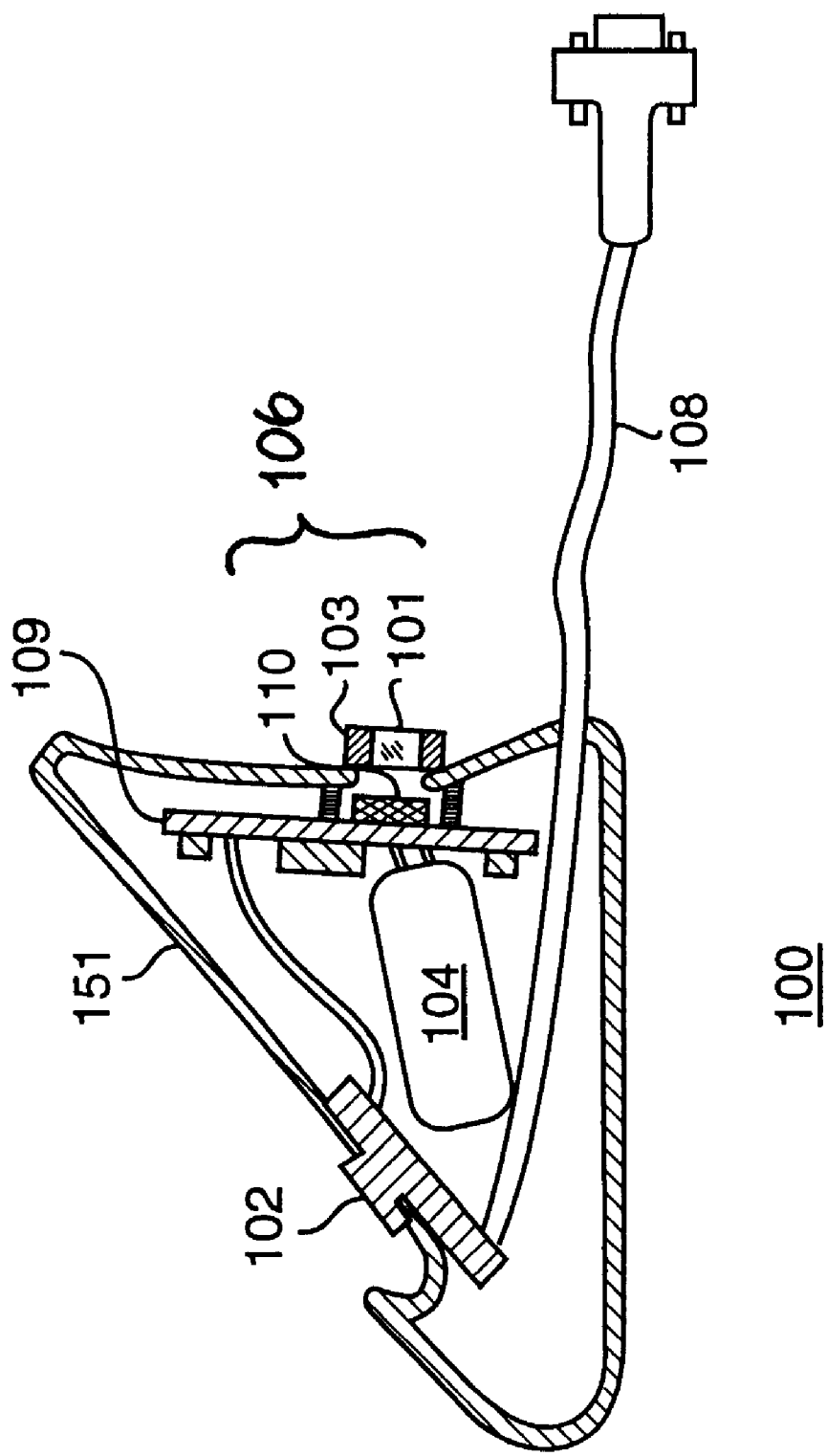
FIG. 4 is a side cut-away view of the computer vision system of the docking station of FIG. 1.

FIG. 4 shows the arrangements of vision system components inside the housing 105 of the docking station 100. A serial port and interface 102 is configured to mechanically and electrically connect with the PDA 150, and with a personal computer via the serial connector 108. The camera 106 is mounted on a circuit board 109. Light enters the camera through a lens 101 focused on a solid state sensor 110. Focusing can be accomplished by means of a bezel 103 surrounding the lens 101. Processors and memories of the vision system, described in greater detail below, are also mounted on the circuit board 109. A power supply, e.g., a battery 104 coupled to the circuit board 109 electrically operates the components of the vision system.

The computer vision system according to one embodiment of the invention uses an "Artificial Retina" (AR) for acquiring images, Mitsubishi Electric Inc. part number M64283FP. The AR is a CMOS image sensor with 128×128 pixels. The AR chip achieves high performance, up to 25 Hz for full frames, and higher for partial frames. Power consumption is 15 mW. The AR chip can execute 1D and 2D projection of an input image. The projection sums all pixels in columns in the vertical direction and rows in the horizontal direction. The image area is approximately 9 mm$^2$. The relative small size (11×7 mm) and low cost of the AR makes this sensor ideal for PDA applications as described herein.

In another embodiment, the sensor is a color CMOS image sensor, Mitsubishi Electric part number M64289U. This sensor has a resolution of 352×288 pixels, and can acquire up to thirty frames per second. The sensor has exposure and gain control.

As another feature, the sensor is mounted on a single semiconductor substrate with a sensor microprocessor that can perform a number of low-level image processing tasks under user control. As is described below, the system according to the invention, allows the PDA to control the sensor's microprocessor.

Figure 5:
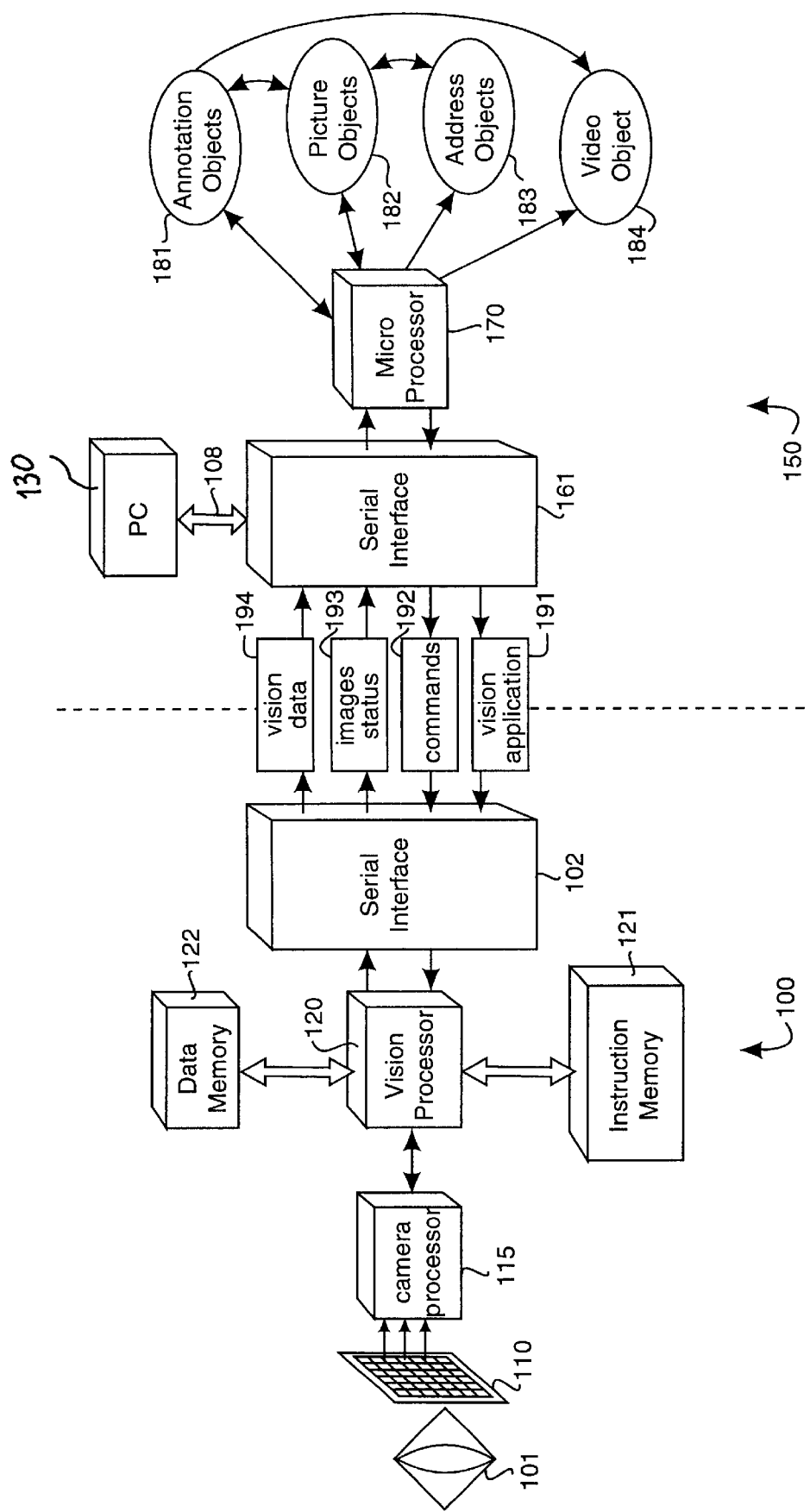
FIG. 5 is flow diagram of modes of operation of the docking station computer vision system.

FIG. 5 shows how the various components of the computer vision system and PDA interact. The computer vision system acquires images through the lens 101. In the preferred embodiment as described above, the image sensor 110 uses CMOS technology, unlike the CCD devices of the prior art. The sensor 110 is co-resident and controlled by a camera sensor microprocessor 115 as described above. In addition, the system includes a vision microprocessor 120. The vision microprocessor has access to an instruction memory 121 that stores programs, such as vision applications, and a data memory 122 for storing images. In one embodiment, the vision processor is a Mitsubishi Electric Inc., single chip, CMOS RISC microcomputer, part number M16C.

As a feature, the memories 121–122 can be downloaded with instructions and data from the PDA 150 to configure the computer vision system 100 for particular vision applications, such as object recognition, human-computer interfacing, pattern recognition, virtual reality and the like. Alternatively, the vision applications can be downloaded from a personal computer (PC) 130, or any other computer via the serial interface 102 and the connector 108.

The computer vision system and PDA 150 communicate via the serial interface 102. A user interface of the PDA sends vision applications 191 and commands 192 to the computer vision system. In response to the commands and vision applications, the computer vision system sends images and status 193 and vision data 194 to the PDA. The PDA can send the data to other systems coupled to the connector 108.

The PDA includes a microprocessor 170 for generating the commands and executing vision applications, and for processing and displaying the images, status information, and vision data. The PDA also includes a memory for storing the images as data objects 182 and 184. The data objects can be picture objects 182 (still images), or video objects 184 (a sequence of images). The PDA also stores other data objects 181 and 183. In the preferred implementation, the images acquired by the computer vision system are stored in the same format as the PDA's data objects. This formatting can be done by the vision processor 120.

Operation

Figure 6:
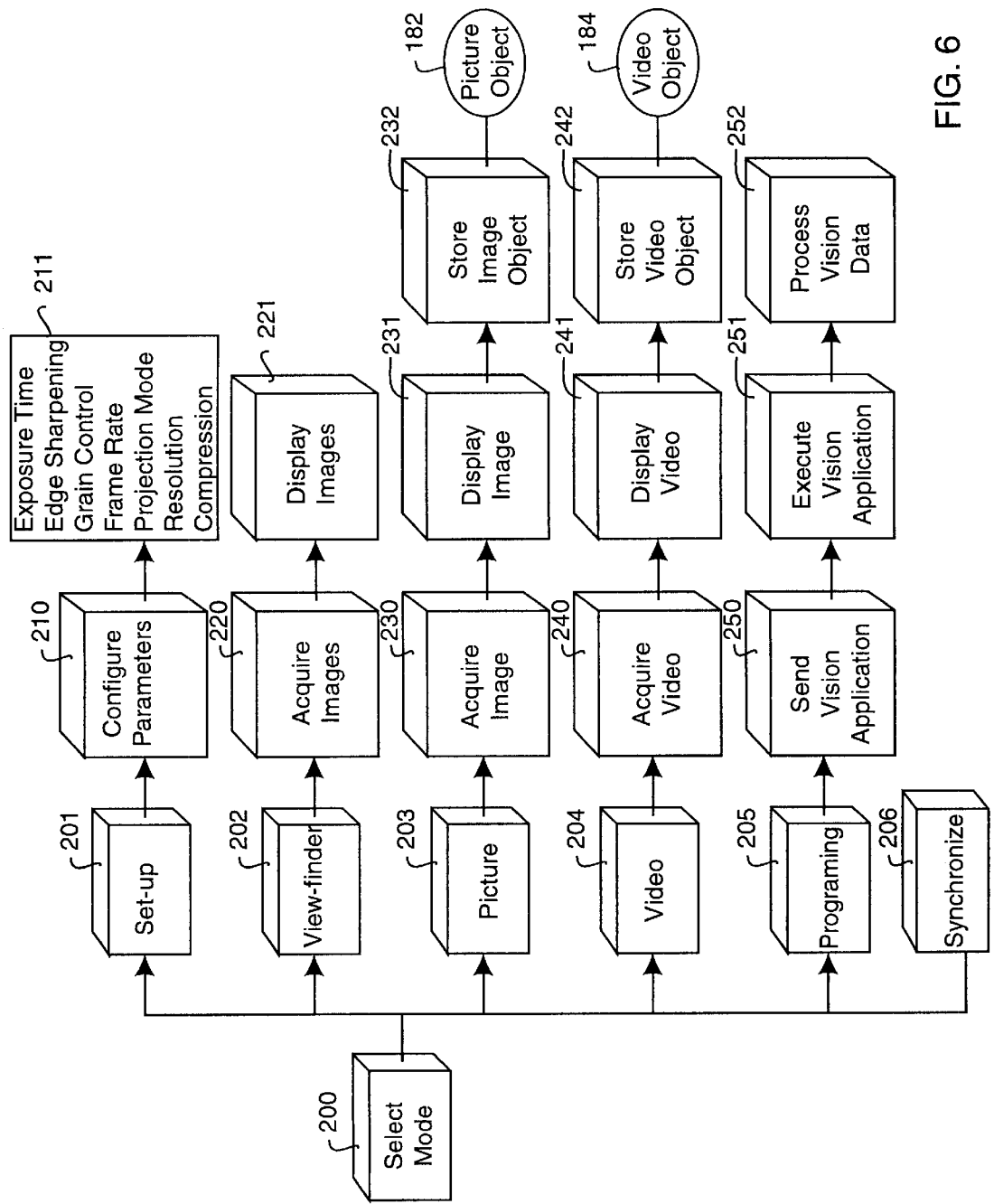
FIG. 6 is a flow diagram of operating modes of the docking station vision system.

As shown in FIG. 6, a user operates the computer vision system and PDA by selecting 200 one of six basic modes, setup 201, view-finder 202, picture 203, video 204, programming 205, and synchronize 206. Operation is performed by using the buttons and the display of the PDA 150, or some other attached computer.

In setup mode 201, the PDA configures 210 computer vision system parameters 211. Computer vision system parameters 211 include exposure, 1D or 2D edge extraction, gain control, frame rate, sensitivity, resolution, compression, and projection mode. Edge extraction is an important precursor step for object recognition tasks in a vision application. In projection mode, the pixels in horizontal rows and vertical columns are summed. This later feature enables, for example, motion, image analysis, and compression applications. The user can also crop images to selected areas of the sensor 110 by specifying a subset of the pixels as active. If the computer vision system has a black and white sensor, then one to eight bit of gray scale can be selected. For a color sensor, up to 24 bits of RGB values can be acquired. Compression can format a picture object as a JPEG file, and a video object as a MPEG file. Other compression standards are also possible. Even if the PDA can only display one or two bits of gray scale, the PDA can still acquire and store images of greater bit depth for display elsewhere.

In view-finder mode 202, the computer vision system acquires images 220, and the PDA displays the images 221 on the display screen 151. However, current image data objects are stored only temporarily in the PDA's memory.

In picture mode 203, the computer vision system acquires images 230, the PDA temporarily stores and displays the images 231, and permanently stores one selected image 232 as a picture object 182.

In video mode 204, the computer vision system acquires a sequence of images 240, i.e., a video. The PDA displays the video 241, and stores the video 242 as a video object 184. In the case that the PDA memory is insufficient, picture and video objects can be up-loaded to the PC 130 or other type of computer using either the infra-red transceiver 170, or the serial interface 102 when the computer vision system is not in use.

In programming mode 205, the user selects a vision application to download 250 to the computer vision system. The application is executed 251, and the PDA processes the vision data 252.

In synchronize mode 206, programs and data of the PDA 150 and vision system 100 can be synchronized with those of another computer system, for example, the PC 130.

In addition, the user of the PDA can link the picture and video objects 182 and 184 to other data objects 181 and 183 managed by the PDA. For example, a picture of a person can be linked to the person's address, a business card object, a facsimile, a message, and the like. Similarly, other video objects can be linked to other objects managed by the PDA.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A docking station adapted to operate with a personal digital assistant, comprising:

an image sensor configured to acquire images;

a sensor microprocessor coupled to the sensor;

a vision microprocessor coupled to the sensor microprocessor and an instruction memory and a data memory;

a communication interface coupled to the vision microprocessor, and configured to interface with a digital personal assistant and a computer system interface;

a power supply;

a housing enclosing the image sensor, the sensor microprocessor, the vision microprocessor and memories, the communications interface, and the power supply; and means for physically and electronically coupling the housing to the personal digital assistant.

2. The docking station of claim 1 wherein the housing has a top substantially oblique surface for receiving the personal digital assistant and a rear surface with a cut-out for receiving a lens.

3. The docking station of claim 1 including means to download vision applications from the personal digital assistant, via the communications interface, to the instruction memory and data memory for execution by the vision microprocessor.

4. The docking station of claim 1 wherein operations and data of the docking station are synchronized with a personal computer.

* * * * *